United States Patent
Yamada et al.

(10) Patent No.: US 7,253,228 B2
(45) Date of Patent: Aug. 7, 2007

(54) METHOD FOR PRODUCING POLYURETHANE EMULSION

(75) Inventors: Tutomu Yamada, Osaka (JP); Kazumi Mai, Amagasaki (JP); Masami Tutumi, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/491,889

(22) PCT Filed: Mar. 25, 2003

(86) PCT No.: PCT/JP03/03627

§ 371 (c)(1),
(2), (4) Date: Apr. 15, 2004

(87) PCT Pub. No.: WO03/082959

PCT Pub. Date: Oct. 9, 2003

(65) Prior Publication Data

US 2004/0242764 A1    Dec. 2, 2004

(30) Foreign Application Priority Data

Mar. 28, 2002  (JP) .............................. 2002-091266

(51) Int. Cl.
*C08J 3/00*  (2006.01)
*C08K 3/20*  (2006.01)
*C08L 75/00*  (2006.01)
*C08G 59/42* (2006.01)
*B01F 5/04*  (2006.01)

(52) U.S. Cl. .................... 524/591; 422/131; 422/134; 422/135; 422/225; 523/319; 523/324; 523/335; 524/589; 524/590; 524/839; 524/840

(58) Field of Classification Search ................ 524/591, 524/839, 840, 589, 590; 523/319, 324, 335; 422/131, 134, 135, 225
See application file for complete search history.

(56) References Cited

U.S. PATENT DOCUMENTS 4,092,286 A * 5/1978 Noll et al. .................. 524/591
4,742,095 A * 5/1988 Markusch et al. .......... 523/322
5,959,027 A * 9/1999 Jakubowski et al. ........ 524/839

FOREIGN PATENT DOCUMENTS

| DE | 2015942    | 12/1971 |
| GB | 1432112    | 4/1976  |
| JP | 4-031439   | 2/1992  |
| JP | 8-291221   | 11/1996 |
| JP | 2000-336173| 12/2000 |

OTHER PUBLICATIONS

Multiple Stage Ultra High Shear Dispersers, Super Dispax Reactor Dr 2000/ . . . , Super Dispax-Reactor Inline, IKA Website www.ikausa.com/drs.htm, Date unknown.*
European Search Report dated Mar. 27, 2006.

* cited by examiner

*Primary Examiner*—Patrick Niland
(74) *Attorney, Agent, or Firm*—Armstrong, Kratz, Quintos, Hanson, & Brooks, LLP.

(57) ABSTRACT

The present invention provides a process for producing a polyurethane emulsion, capable of continuously producing a polyurethane emulsion which contains substantially no organic solvent and also has excellent storage stability over time. Disclosed is a process for producing a polyurethane emulsion by emulsifying a urethane prepolymer, which contains substantially no organic solvent and also has at least two isocyanate groups per one molecule, with water and completing chain extension, the process comprising (1) a first step of supplying the urethane prepolymer and water in an emulsifying apparatus comprising a stator section 5 fixed inside a cylindrical casing 1 and a rotor section 3 fixed to a rotational shaft 2 in the casing 1, the rotor section 3 having multiple rotor teeth 4, the stator section 5 having multiple stator teeth 6, which stand face to face with the rotor teeth 4, the stator section 5 having an inlet 8 and an outlet 10, from the inlet 8, continuously emulsifying them to obtain an emulsion of the urethane prepolymer having an average particle size of 0.1 to 2.5 µm, and discharging the emulsion from the outlet 10, and (2) a second step of reacting the emulsion of the urethane prepolymer obtained in the first step with a chain extender, thereby completing chain extension of the urethane prepolymer.

5 Claims, 6 Drawing Sheets

METHOD FOR PRODUCING POLYURETHANE EMULSION

BACKGROUND OF THE INVENTION

1. Field of the Invention

The present invention relates to a process for producing a polyurethane emulsion having excellent storage stability by continuously emulsifying a urethane prepolymer containing substantially no organic solvent with water and reacting the urethane prepolymer with a chain extender.

This application is filed under 35 USC 371 based on the National Stage of International Application No. PCT/JP03/03627, filed on Mar. 25, 2003, the content of which is incorporated herein by reference. Priority is claimed on Japanese Patent Application No. 2002-91266, filed Mar. 28, 2002, the content of which is incorporated herein by reference.

2. Description of Related Art

In various fields relating to paints, inks, adhesives, textile processing and paper processing, polyurethane emulsions are used. To ensure excellent dispersion stability of the polyurethane emulsion, it is required that particles of the polyurethane emulsion have relatively small particle size and that dispersed particles of the emulsion are less likely to separate and settle over time and also are superior in storage stability.

As the process for producing a polyurethane emulsion having superior storage stability, there has been employed a process of premixing a urethane prepolymer with water containing an emulsifier using a simple propeller blade type mixer and finely dispersing the urethane prepolymer under high pressure conditions using a homogenizer.

When using a urethane prepolymer containing substantially no organic solvent in such a process, the resulting emulsion contains particles having relatively large particle size and poor storage stability over time. Therefore, a urethane prepolymer containing a certain amount of an organic solvent (in an amount of about 25 to 60 parts by weight based on 100 parts by weight of the solid content of the urethane prepolymer) must be used so as to obtain a polyurethane emulsion having superior storage stability.

Thus, it is necessary to perform the step of removing an organic solvent, which is optionally contained, so as to obtain an environmentally friendly polyurethane emulsion containing substantially no organic solvent.

The above process of the prior art had problems in that it requires numerous steps for fine dispersions and also requires the step of removing an organic solvent because the organic solvent is contained, resulting in poor production efficiency. Furthermore, the organic solvent contained in the urethane prepolymer remains in the polyurethane emulsion.

To solve these problems, there is proposed a process for continuously emulsifying by supplying a mixed solution of a urethane prepolymer and water in an emulsifying apparatus comprising a rotor section having multiple rotor teeth fixed to a rotational shaft provided in a cylindrical casing and a stator section having multiple stator teeth, which stand face to face with the rotor teeth, the stator section having an inlet, (see, for example, Japanese Patent Application, Second Publication No. Hei 7-68355 (pages 2 to 5)).

According to this process, an emulsion of a urethane prepolymer comprising fine particles can be obtained by continuously emulsifying a certain urethane prepolymer; however, there cannot be obtained a polyurethane emulsion which contains substantially no organic solvent and also has excellent storage stability over time. There is a problem in that the resulting emulsion has poor storage stability when using a urethane prepolymer which has an isocyanate group and has no hydrophilic group.

As the urethane prepolymer, a urethane prepolymer having a hydrophilic group such as ionic group, or a urethane prepolymer which has no hydrophilic group or has a very small content of hydrophilic group is used according to the purposes, and there is required a process capable of producing satisfactory polyurethane emulsion even when using any urethane prepolymer. Among the above urethane prepolymers, as the content of the hydrophilic group in the urethane prepolymer increases, the particle size of the polyurethane emulsion obtained by emulsification tends to become small.

In the above process for continuously emulsifying (see, for example, Japanese Patent Application, Second Publication No. Hei 7-68355 (pages 2 to 5)), when using a urethane prepolymer having no hydrophilic group, or a urethane prepolymer having a very small content of the hydrophilic group wherein the content of an ionic group such as anionic group or cationic group, as a hydrophilic group, is 0.01 equivalents or less based on 100 parts by weight of the urethane prepolymer, or the content of a nonionic hydrophilic group is 5 parts by weight or less based on 100 parts by weight of the urethane prepolymer, the particle size of the emulsion cannot become sufficiently small.

When using a urethane prepolymer wherein the content of the nonionic hydrophilic group is 10 parts by weight or more based on 100 parts by weight of the urethane prepolymer, the particle size can become small to some extent. However, the viscosity of the resulting polyurethane emulsion increases, and therefore the solid content of the polyurethane emulsion is limited to about 30% by weight or less and high concentration polyurethane emulsion cannot be obtained.

Thus, this process had such a problem that it is impossible to continuously produce a polyurethane emulsion which contains substantially no organic solvent and also has excellent storage stability over time.

SUMMARY OF THE INVENTION

An object of the present invention is to provide a process for producing a polyurethane emulsion, capable of continuously producing a polyurethane emulsion which contains substantially no organic solvent and also has excellent storage stability over time.

The present inventors have intensively researched to achieve the above object and found that, according to the process of the prior art, a urethane prepolymer and water are previously mixed and then supplied in an emulsifying apparatus in a state of low viscosity (for example, in a coarsely dispersed state where an average particle size of a urethane prepolymer is from about several tens to several hundreds of microns), and therefore a high shear force is not uniformly applied by the rotor teeth rotating at high speed and it is not easy to obtain a finely dispersed emulsion of an urethane prepolymer, resulting in poor storage stability over time.

Consequently, it has been made clear that, by supplying a urethane prepolymer and water in an emulsifying apparatus without previously dispersing them with each other, a high shear force can be uniformly applied to the urethane prepolymer by the rotor teeth rotating at high speed and an emulsion of a urethane prepolymer having a fine particle size can be continuously produced.

Furthermore, it has been found that a polyurethane emulsion having excellent storage stability can be continuously produced by using a urethane prepolymer, which contains substantially no organic solvent and also has at least two isocyanate groups per one molecule, emulsifying the urethane prepolymer with water to obtain an emulsion of the urethane prepolymer having an average particle size of 0.1 to 2.5 µm, and continuously reacting the emulsion with a chain extender, thereby completing chain extension of the urethane prepolymer. Thus, the present invention has been completed.

That is, the present invention provides a process for producing a polyurethane emulsion by emulsifying a urethane prepolymer, which contains substantially no organic solvent and also has at least two isocyanate groups per one molecule, with water and completing chain extension, the process comprising:

(1) a first step of supplying the urethane prepolymer and water from a inlet into an emulsifying apparatus comprising a stator section fixed inside a cylindrical casing and a rotor section fixed to a rotational shaft in the casing, the rotor section having multiple rotor teeth, the stator section having multiple stator teeth, which stand face to face with the rotor teeth, the stator section having the inlet and an outlet, continuously emulsifying them to obtain an emulsion of the urethane prepolymer having an average particle size of 0.1 to 2.5 µm, and discharging the emulsion from the outlet, and (2) a second step of reacting the emulsion of the urethane prepolymer obtained in the first step with a chain extender, thereby completing chain extension of the urethane prepolymer.

According to the process for producing a polyurethane emulsion of the present invention, it is made possible to eliminate the step of removing an organic solvent and to continuously produce a polyurethane emulsion which contains substantially no organic solvent and an average particle size within a range from 0.1 to 2.5 µm, and also has excellent storage stability.

BRIEF DESCRIPTION OF THE DRAWINGS

In FIG. 3, comb-shaped teeth 5a on the stator and slits 5b between the comb-shaped teeth on the stator are omitted. Also the section of a casing 1 is omitted.

In FIG. 4, comb-shaped teeth 3a on the rotor and slits 3b between the comb-shaped teeth on the rotor are omitted. Also the section of a casing 1 is omitted.

DETAILED DESCRIPTION OF THE INVENTION

The present invention will now be described in detail.

The process for producing a polyurethane emulsion of the present invention comprises supplying a urethane prepolymer, which contains substantially no organic solvent and also has at least two isocyanate groups per one molecule, and water in a specific emulsifying apparatus, continuously emulsifying the urethane prepolymer with water to obtain an emulsion of the urethane prepolymer having an average particle size of 0.1 to 2.5 µm, and continuously reacting the emulsion with a chain extender, thereby completing chain extension of the urethane prepolymer.

The specific emulsifying apparatus used in the present invention will now be described in detail.

Figure 1:
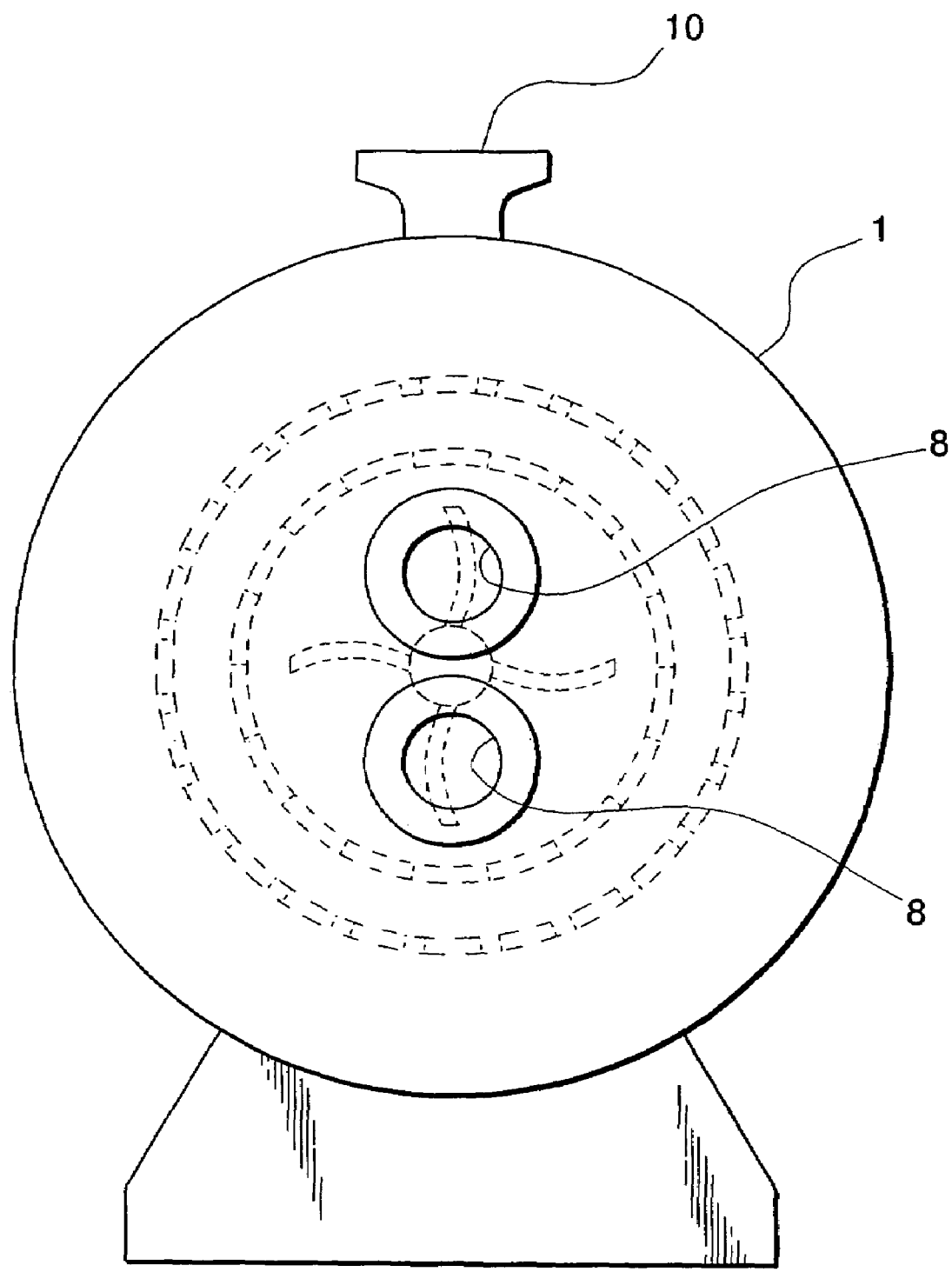
FIG. 1 is a schematic view showing an emulsifying apparatus used in the present invention.
Figure 2:
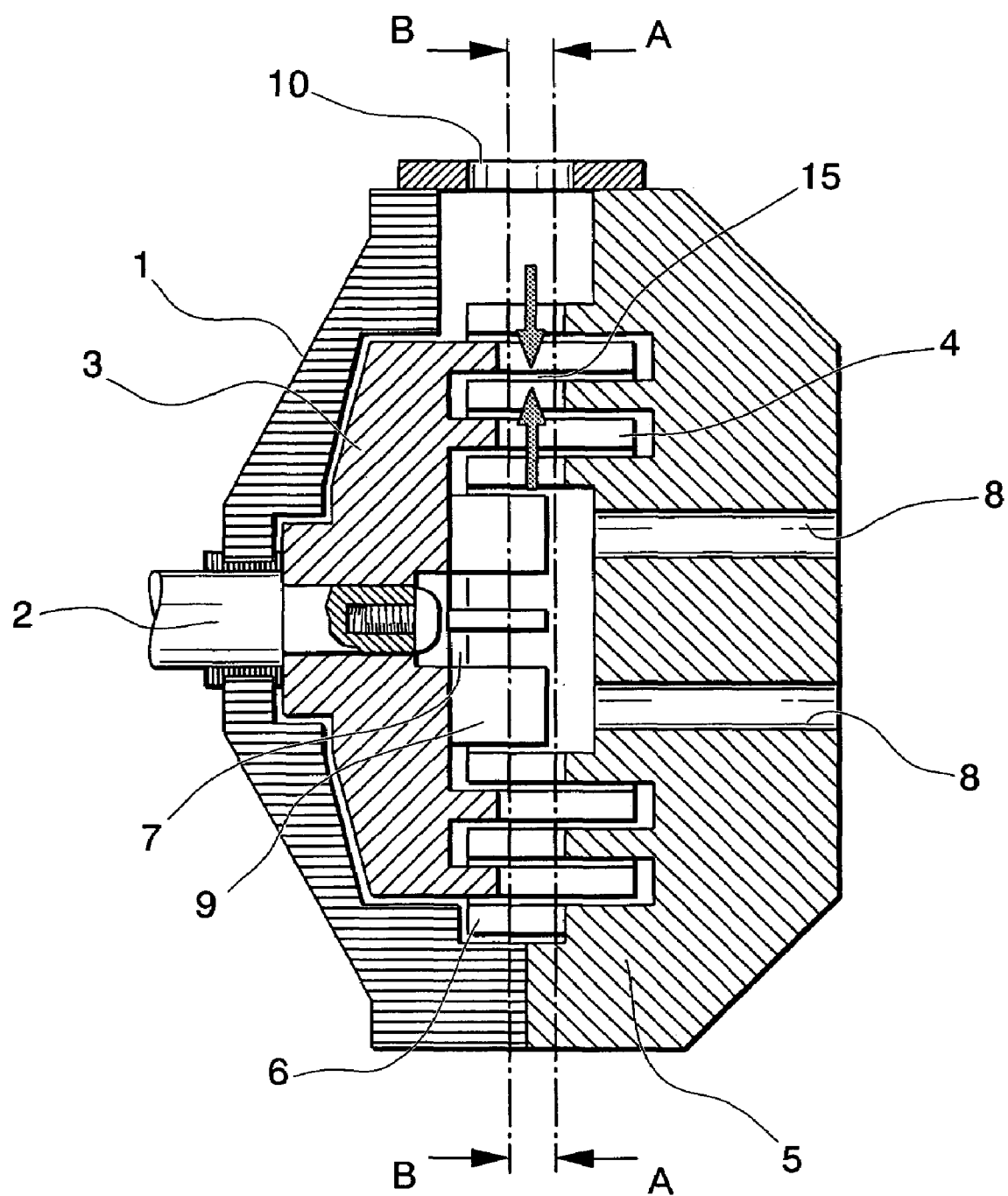
FIG. 2 is a sectional side view showing a rotor section 3 and a stator section 5 of an emulsifying apparatus used in the present invention.

As shown in FIG. 1 and FIG. 2, the emulsifying apparatus used in the present invention may have a structure comprising a stator section 5 having multiple stator teeth 6 fixed inside a cylindrical casing 1 and a rotor section 3 having multiple rotor teeth 4 fixed to a rotational shaft 2 in the casing 1, the stator section 5 having at least two inlets 8. At least two inlets 8 are preferably provided. Multiple rotor teeth 4 can be rotated at high speed by the rotation of the rotational shaft 2.

At least two inlets 8 are preferably provided. By providing the stator section 5 with at least two inlets 8, it becomes easier to supply the urethane prepolymer and water in the emulsifying apparatus without mutually mixing them. By employing this structure, the urethane prepolymer and water can be separately supplied from two inlets 8 and therefore a shear force can be applied under proper viscosity just before the urethane prepolymer is dispersed in water, thus making it possible to form more fine particles.

Three or more inlets 8 can also be provided. In this case, emulsifiers or other additives can be charged from an inlet 8 different from those used to charge water and urethane prepolymer, in addition to the urethane prepolymer and water, and then be uniformly mixed.

Figure 5:
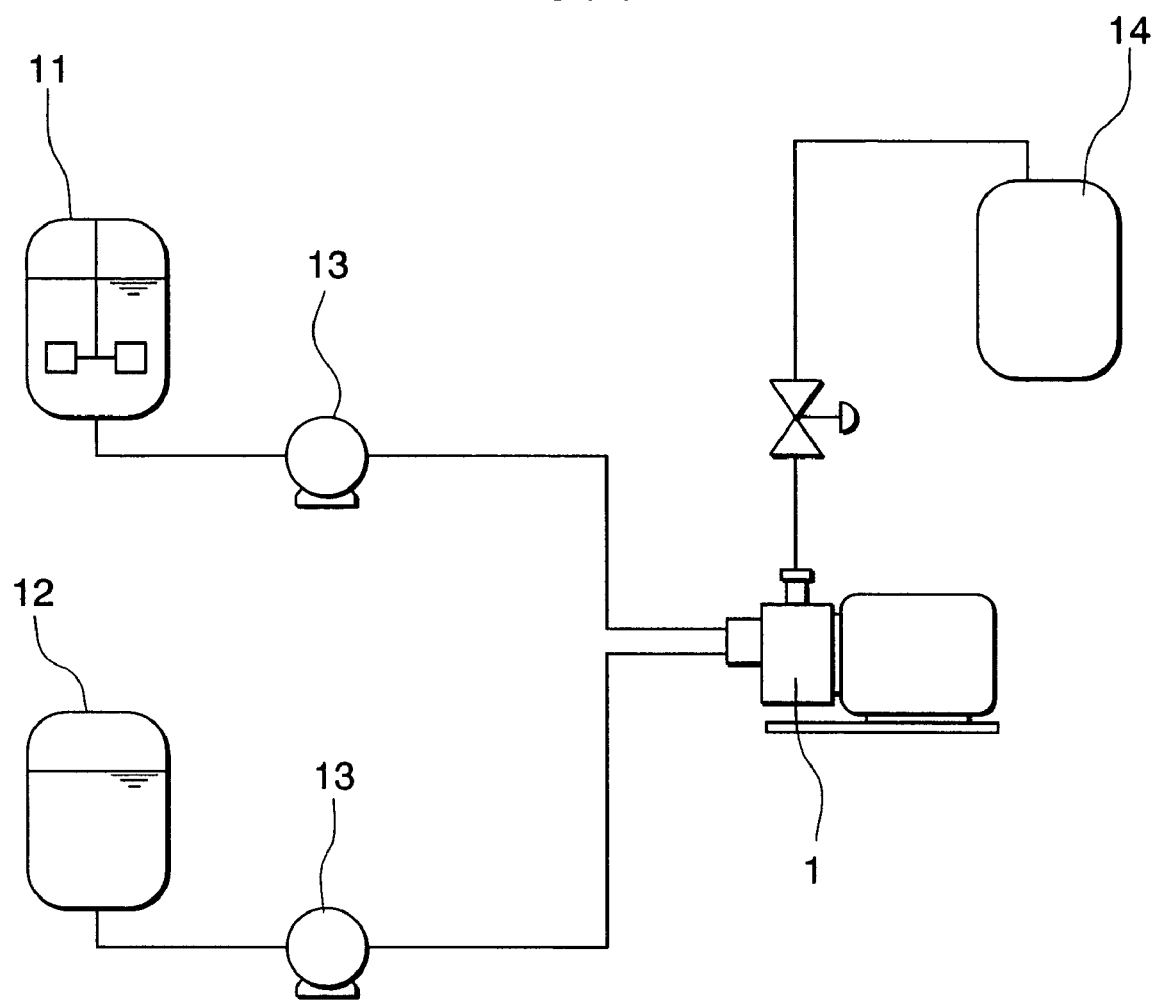
FIG. 5 is a schematic view showing a liquid feed line of a production process of an emulsion of a urethane prepolymer produced in the present invention.

As shown in FIG. 5, the urethane prepolymer and water are continuously supplied from the inlet 8 of the stator section 5 by two pumps 13 which are separately connected to a urethane prepolymer reaction vessel 11 and a water tank 12.

An outer diameter of the rotor section 3 and the stator section 5 can be optionally selected and a peripheral velocity of the outermost periphery is decided by a combination of an outer diameter L of the rotor and a rotational velocity R of the rotor section 3. A peripheral velocity X of a rotor tooth at the outermost periphery among multiple rotor teeth 4 is preferably within a range from 30 to 70 m/s, and more preferably from 40 to 60 m/s. When the peripheral velocity X of the rotor tooth at the outermost periphery is within the above range, there can be obtained a shear force which is sufficiently effective for emulsification.

The peripheral velocity X (unit: m/s) of the rotor tooth at the outermost periphery can be calculated from a value of an outer diameter L (unit: m) of the rotator and a value of a rotational velocity R (unit: rpm) based on the following equation [1].

$$X = \Pi L \times (R/60) \qquad \text{Equation (1)}$$

According to the equation [1], when the outer diameter of the rotor is 13 cm and the rotational velocity is 6000 rpm, the peripheral velocity X of the rotor tooth at the outermost periphery is 40.8 m/s.

Figure 3:
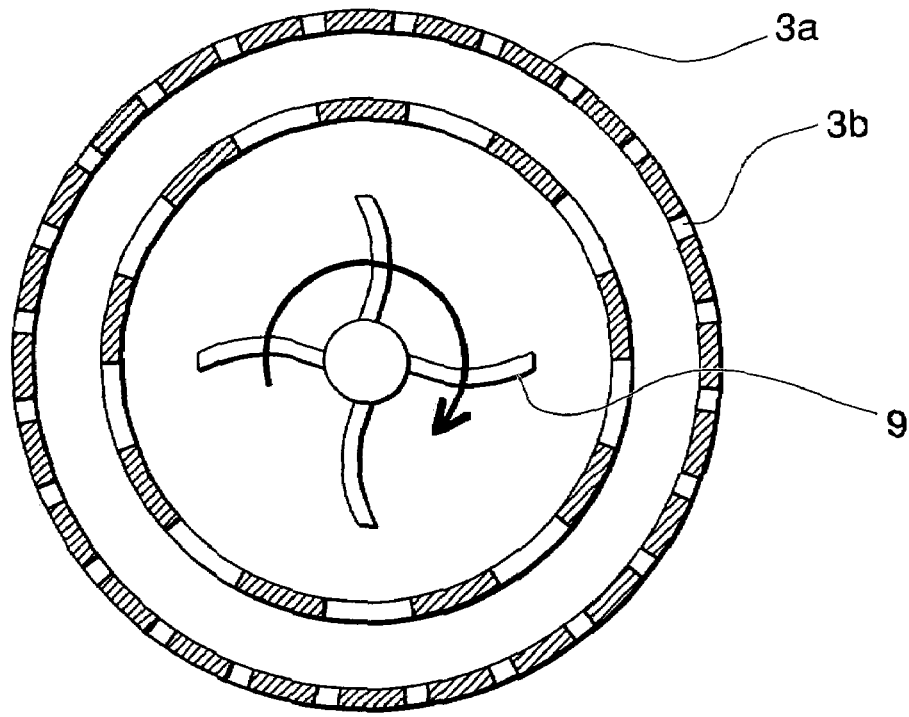
FIG. 3 is a sectional view taken along lines A-A in FIG. 2 of the rotor section 3 of the emulsifying apparatus used in the present invention.
Figure 4:
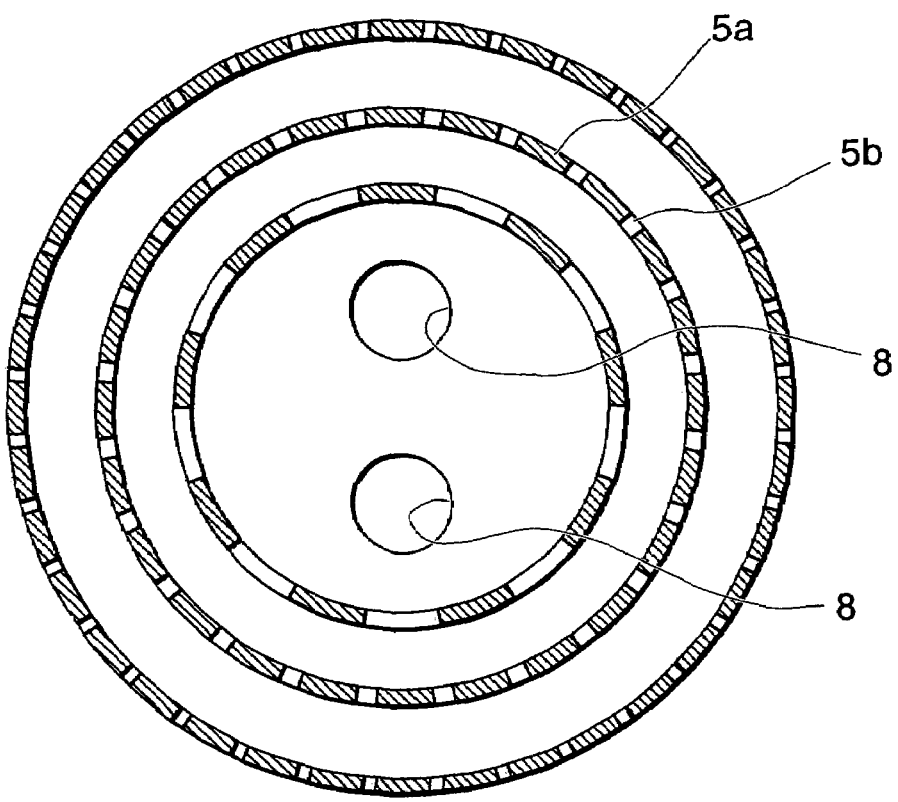
FIG. 4 is a sectional view taken along lines B-B in FIG. 2 of the stator section 5 of the emulsifying apparatus used in the present invention.

As shown in FIG. 2, FIG. 3 and FIG. 4, the stator section 5 is provided with at least two generally ring-shaped stator teeth 6 and the rotor section 3 is provided with at least two generally ring-shaped rotor teeth 4 inside the stator teeth 6. The rotor teeth 4 and the stator teeth 6 are respectively provided with multiple comb-shaped teeth 3a and multiple comb-shaped teeth 5a in a circumferential direction.

Between the comb-shaped teeth 3a on the rotor teeth 4 and between the comb-shaped teeth 5a on the stator teeth 6, slits 3b and slits 5b are respectively provided. In FIG. 3, the comb-shaped teeth 5a on the stator teeth 6, and the slits 5b between the comb-shaped teeth on the stator teeth are omitted. In FIG. 4, the comb-shaped teeth 3a on the rotor teeth 4, and the slits 3b between the comb-shaped teeth on the rotor teeth are omitted. In FIG. 3 and FIG. 4, the section of a casing 1 is omitted.

With respect to the width of these slits 3b and slits 5b (hereinafter referred to as a slit width), the slit width is preferably reduced so that the average particle size of the resulting polyurethane emulsion becomes small in the case of the stator and rotor located at the outer side, and a slit width at the inner side is preferably within a range from 3 to 10 mm and a slit width at the outermost periphery is preferably within a range from 0.1 to 1.0 mm.

Between the rotor teeth 4 and the stator teeth 6, a clearance 15 is provided and the width of the clearance 15 is preferably within a range from 100 to 1000 µm, and more preferably from 100 to 500 µm. When the width of the clearance 15 between the rotor teeth 4 and the stator teeth 6 is within the above range, a polyurethane emulsion having fine particles can be obtained.

The emulsifying apparatus used in the present invention has a space section 7 surrounded by the rotor section 3 and the stator section 5 in the vicinity of a rotational shaft. In the vicinity of the rotational shaft of the space section 7, since the urethane prepolymer and water charged in the casing 1 easily moves rapidly in a circumferential direction by a centrifugal force due to the rotation of the rotor section 3, it is preferable to provide a blade 9 inside the rotor section 3.

In the first step of the process for producing a polyurethane emulsion according to the present invention, a urethane prepolymer and water are supplied from the inlet 8 of the emulsifying apparatus having the above-described feature and then continuously emulsified while applying a high shear force to the urethane prepolymer and water.

First, a urethane prepolymer, which substantially contains no organic solvent and also has at least two isocyanate groups per one molecule, and water flow into a space section 7 from the inlet 8 and simultaneously flow into a clearance between the rotor teeth 4 and the stator teeth 6 located at a first stage in a centrifugal direction from a central axis of the rotation by a centrifugal force produced by rotating the rotor section 3 at high speed, and then pass through multiple slits 3b and multiple slits 5b of the rotor teeth 4 and the stator teeth 6.

The urethane prepolymer and water flow into a clearance between the rotor teeth 4 and the stator teeth 6 located at a second stage in a centrifugal direction from a central axis of the rotation, and then a shear force based on velocity gradient of the rotor teeth 4 in a tangential direction is applied on the urethane prepolymer, and thus the urethane prepolymer is dispersed in water.

The step of passing the urethane prepolymer and water through multiple slits 3b and multiple slits 5b of the rotor teeth 4 and the stator teeth 6 and applying a shear force based on velocity gradient of the rotor teeth 4 is sequentially repeated at high speed, and thus the urethane prepolymer is finely dispersed in water and then an emulsion of the urethane prepolymer having an average particle size of 0.1 to 2.5 µm is discharged from an outlet 10.

In the second step, the emulsion of the urethane prepolymer obtained in the first step is reacted with a chain extender, thereby completing chain extension of the urethane prepolymer, thus making it possible to continuously produce a polyurethane emulsion.

Although it is not required to apply a pressure in the emulsifying apparatus, a back pressure of about 1 to 3 kg/cm$^2$ is preferably applied for the stable operation of the emulsifying apparatus without causing cavitation.

A flow rate of the urethane prepolymer and water, into the emulsifying apparatus, is preferably from 0.1 to 4 m$^3$ per hour, and is particularly preferably from 0.5 to 2 m$^3$ per hour, in view of productivity.

When the urethane prepolymer is supplied in the emulsifying apparatus, the urethane prepolymer is necessary to heat until getting appropriate fluidity so as to adjust the viscosity of the urethane prepolymer to the viscosity suited for emulsification.

The methods for adjusting the viscosity of the urethane prepolymer includes addition of a chemical agent having low activity with an isocyanate group of the urethane prepolymer or a chemical agent having no reactive group, for example, chemical agents having low viscosity, such as plasticizer, and epoxy diluent.

A mixing ratio of the urethane prepolymer to the total weight of the urethane prepolymer and water to be supplied in the emulsifying apparatus varies depending on the viscosity of the urethane prepolymer to be supplied in the emulsifying apparatus. To obtain an emulsion having fine particles, when the urethane prepolymer has a hydrophilic group, the content of the urethane prepolymer having a hydrophilic group is preferably within a range from 30 to 50% by weight. When the urethane prepolymer has no hydrophilic group, the content of the urethane prepolymer having no hydrophilic group is preferably within a range from 50 to 90% by weight.

After emulsifying at the above mixing ratio of the urethane prepolymer to the total weight of the urethane prepolymer and water, the resulting emulsion can be optionally diluted by further additional water.

The urethane prepolymer used in the present invention will now be described.

The urethane prepolymer used in the present invention is a urethane prepolymer which contains substantially no organic solvent and also has at least two isocyanate groups per one molecule. Such a urethane prepolymer refers to a urethane prepolymer wherein the content of the organic solvent in the urethane prepolymer is 10% by weight or less. To eliminate the step of removing the organic solvent, the content of the organic solvent is preferably 5% by weight or less, more preferably 1% by weight or less, and most preferably 0.1% by weight or less.

The number average molecular weight of the urethane prepolymer used in the present invention is preferably within a range from 1,000 to 20,000.

The urethane prepolymer used in the present invention can be produced by a conventionally known process, for example, a process for reacting a polyisocyanate compound with an active hydrogen-containing compound and examples thereof include 1) a process for reacting a polyisocyanate compound described hereinafter with a polyol compound described hereinafter without using an organic solvent, and 2) a process for reacting a polyisocyanate compound described hereinafter with a polyol compound described hereinafter in an organic solvent, followed by removal of the solvent. Among these processes, the former process is preferable because the step of removing the solvent is not required.

In the above reaction, the polyisocyanate compound is reacted with the active hydrogen-containing compound at a temperature of preferably from 20 to 120° C., and more preferably 30 to 100° C. at an equivalent ratio of an isocyanate group to an active hydrogen group of preferably from 1.1:1 to 3:1, and more preferably from 1.2:1 to 2:1.

In the reaction, an excess isocyanate group is optionally reacted with aminosilane, thereby converting the terminal group into a reactive group other than isocyanate group, such as an alkoxysilyl group.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate.

The active hydrogen-containing compound used to produce the urethane prepolymer used in the present invention includes, for example, a compound having comparatively high molecular weight (hereinafter referred to as a high-molecular weight compound) and a compound having comparatively low molecular weight (hereinafter referred to as a low-molecular weight compound).

The number average molecular weight of the high-molecular weight compound is preferably within a range from 300 to 10,000, and more preferably from 500 to 5,000. The number average molecular weight of the low-molecular weight compound is less than 300.

These active hydrogen-containing compounds may be used alone, or two or more kinds of them may be used in combination.

Among these active hydrogen-containing compounds, examples of the high-molecular weight compound include polyester polyol, polyether polyol, polycarbonate polyol, polyacetal polyol, polyacrylate polyol, polyesteramide polyol, polythioether polyol, polyolefin polyols such as polybutadiene polyol, and so on.

As the polyester polyol, polyester polyol obtained by the polycondensation reaction of a glycol described hereinafter and an acid described hereinafter can be used.

Examples of the glycol, which can be used to obtain the polyester polyol, include ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol (molecular weight: 300 to 6,000), dipropylene glycol, tripropylene glycol, bishydroxyethoxybenzene, 1,4-cyclohexanediol, 1,4-cyclohexanedimethanol, bisphenol A, hydrogenated bisphenol A, hydroquinone, and alkylene oxide adducts thereof.

Examples of the acid, which can be used to obtain the polyester polyol, include succinic acid, adipic acid, azelaic acid, sebacic acid, dodecanedicarboxylic acid, maleic anhydride, fumaric acid,1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also a polyester obtained by the ring-opening polymerization reaction of a cyclic ester compound such as ε-caprolactone, and copolyesters thereof can be used.

Examples of the polyether polyol include compounds obtained by the polyaddition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, aconite saccharide, trimellitic acid, hemimellitic acid, phosphoric acid, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, tetrahydrofuran, and cyclohexylene.

Examples of the polycarbonate polyol include compounds obtained by the reaction of glycols such as 1,4-butanediol, 1,6-hexanediol, and diethylene glycol, with diphenyl carbonate and phosgene.

Among the active hydrogen-containing compounds, the low-molecular weight compound is a compound which has at least two active hydrogens per one molecule and has a number average molecular weight of less than 300 and examples thereof include glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydazine, diethylenetriamine, and triethylenetetramine.

The average particle size of the polyurethane emulsion obtained in the present invention varies depending on the presence or absence of a hydrophilic group or the content of a hydrophilic group in the urethane prepolymer to be used. The average particle size of the polyurethane emulsion obtained by using the urethane prepolymer having a hydrophilic group is smaller than that in case of using the urethane prepolymer having no hydrophilic group.

Specifically, the hydrophilic group means an ionic group such as an anionic group (for example, carboxyl group, sulfonic acid group, or phosphoric acid group) or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

The polyurethane emulsion having a smaller average particle size is preferable and has excellent storage stability.

When the urethane prepolymer has a hydrophilic group, a finely dispersed polyurethane emulsion having an average particle size of about 0.1 to 1.0 μm can be obtained and has excellent storage stability. Therefore, the resulting polyurethane emulsion is suited to various uses such as paints, inks, pigment vehicles, adhesives, and primers of plastic film.

When the resulting polyurethane emulsion is used in combination with other kinds of emulsions and other chemicals for various purposes such as textile processing, paper processing, and glass fiber binder, a urethane prepolymer having an ionic group such as an anionic group or cationic group is not preferably used because a polyurethane emulsion having an anionic or cationic hydrophilic group is likely to agglomerate and settle in mixing.

In these purposes, therefore, a urethane prepolymer having no ionic group, a urethane prepolymer having a very small content of an ionic group, and a urethane prepolymer having a nonionic hydrophilic group such as polyoxyethylene chain are preferably used.

The urethane prepolymer having a very small content of an ionic group is specifically a urethane prepolymer wherein the content of the ionic group such as an anionic group or cationic group is 0.01 equivalents or less based on 100 parts by weight of the urethane prepolymer.

When the content of the nonionic hydrophilic group exceeds 20 parts by weight based on 100 parts by weight of the urethane prepolymer, the particle size can become small but the resulting polyurethane emulsion has high viscosity, and therefore the solid content of the polyurethane emulsion is limited within a range from about 20 to 30% by weight and it is not preferable according to the purposes. In practice, the content of the nonionic hydrophilic group is preferably controlled to 20 parts by weight or less, and more preferably 10 parts by weight or less, based on 100 parts by weight of the urethane prepolymer.

Even when using any type of urethane prepolymers described above, according to the present invention, dispersed particles having an average particle size within a range from 0.1 to 2.5 μm are less likely to separate and settle over time and a polyurethane emulsion having excellent storage stability can be obtained.

In the present invention, according to the purposes, a urethane prepolymer having an ionic group such as anionic group or cationic group, or a urethane prepolymer having a hydrophilic group such as nonionic hydrophilic group can be used, as described above. In this case, an emulsion having a small average particle size can be obtained.

Among hydrophilic groups, a nonionic hydrophilic group having a repeating unit of ethylene oxide is preferable because the finally obtained polyurethane emulsion has excellent compatibility with other kinds of emulsions. Introduction of a carboxyl group and/or a sulfonic acid group is effective to make the particle size finer.

The ionic group refers to a functional group capable of serving as a hydrophilic ionic group which contributes to self dispersibility in water by neutralization.

When the ionic group is an anionic group, the neutralizer used for neutralization includes, for example, nonvolatile bases such as sodium hydroxide and potassium hydroxide; and volatile bases such as tertiary amines (e.g. trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the compound having an ionic group. Alternatively, neutralization may be conducted during or after the urethane polymerization reaction.

To introduce a hydrophilic group in the urethane prepolymer, a compound, which has at least one active hydrogen atom per one molecule and also has the above hydrophilic group, may be used as an active hydrogen-containing compound.

Examples of the compound, which has at least one active hydrogen atom per one molecule and also has the above hydrophilic group, include sulfonic acid group-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4, 6-disulfonic acid, and 2,4-diaminotoluene-5-sulfonic acid, and derivatives thereof, or polyester polyols obtained by copolymerizing them;

carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and derivatives thereof, or polyester polyols obtained by copolymerizing them;

tertiary amino group-containing compounds such as methyldiethanolamine, butyldiethanolamine, and alkyldiisopropanolamine, and derivatives thereof, or polyester polyol or polyether polyol obtained by copolymerizing them;

reaction products of the above tertiary amino group-containing compounds, or derivatives thereof, or polyester polyols or polyether polyols obtained by copolymerizing them, with quaternizing agents such as methyl chloride, methyl bromide, dimethylsulfuric acid, diethylsulfuric acid, benzyl chloride, benzyl bromide, ethylenechlorohydrin, ethylenebromohydrin, epichlorohydrin, and bromobutane; and nonionic group-containing compounds such as polyoxyethylene glycol or polyoxyethylene-polyoxypropylene copolymer glycol, which has at least 30% by weight of a repeating unit of ethylene oxide and at least one active hydrogen in the polymer and also has a molecular weight of 300 to 20,000, polyoxyethylene-polyoxybutylene copolymer glycol, polyoxyethylene-polyoxyalkylene copolymer glycol, and monoalkyl ether thereof, or polyester-polyether polyols obtained by copolymerizing them.

These compounds can be used alone, or two or more kinds of them can be used in combination.

When the urethane prepolymer has a hydrophilic group in the molecule, water used in the present invention may not contain an emulsifier. On the other hand, when the urethane prepolymer has no hydrophilic group, water must contain an emulsifier so as to improve the storage stability of the polyurethane emulsion by finely dispersing the urethane prepolymer in water.

Examples of the emulsifier include nonionic emulsifiers such as polyoxyethylene-polyoxypropylene copolymer, polyoxyethylene nonylphenyl ether, polyoxyethylene lauryl ether, polyoxyethylene styrenated phenyl ether, and polyoxyethylene sorbitol tetraoleate;

anionic emulsifiers such as fatty acid salt (e.g. sodium oleate), alkyl sulfate ester salt, alkylbenzene sulfonate, alkyl sulfosuccinate, naphthalene sulfonate, alkane sulfonate sodium salt, and sodium alkyldiphenyl ether sulfonate; and nonionic anionic emulsifiers such as polyoxyethylene alkyl sufonate, and polyoxyethylene alkyl phenyl sulfonate.

The amount of the emulsifier is preferably within a range from 0.1 to 15 parts by weight, and more preferably from 1 to 10 parts by weight, based on 100 parts by weight of the urethane prepolymer.

The urethane prepolymer used in the present invention is preferably liquid at normal temperature, or has high viscosity at normal temperature, or is solid at normal temperature but has a viscosity of 200 to 10,000 mPa·s at a temperature higher than a melting point in view of high efficiency of emulsification by high shear force using an emulsifying apparatus and good processability.

In the process for producing polyurethane emulsion of the present invention, aqueous dispersions and stabilizers can be optionally added to water. Examples of the aqueous dispersion include emulsions of polyvinyl acetate, polyethylene-vinyl acetate, polyacrylic, and polyacrylic-styrenic; latexes of polystyrene-butadiene, polyacrylonitrile-butadiene, and polyacrylic-butadiene; aqueous dispersions of polyethylene and polyolefin ionomers; and various aqueous dispersions of polyurethane, polyester, polyamide, and epoxy resin.

In the first step of the present invention, an emulsion of a urethane prepolymer having an average particle size of 0.1 to 2.5 μm is first obtained.

In the second step of the present invention, the emulsion of the urethane prepolymer obtained in the first step is reacted with a chain extender, thereby to complete chain extension of the urethane prepolymer, thus making it possible to continuously produce a polyurethane emulsion having excellent storage stability.

Examples of the chain extender used in the present invention include water; diamines such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, aminopropylethanolamine, aminohexylethanolamine, aminoethylpropanolamine, aminopropylpropanolamine, and aminohexylpropanolamine; polyamines such as diethylenetriamine, dipropylenetriamine, and triethylenetetramine; hydrazines; acid hydrazides. These chain extenders can be used alone or in combination.

According to the present invention, the step of removing the organic solvent can be eliminated and a polyurethane emulsion, which contains emulsion particles having a very small average particle size and has excellent storage stability, can be provided even when using a urethane prepolymer having no hydrophilic group, or a urethane prepolymer having a very small content of the hydrophilic group.

EXAMPLES

The present invention will be described in detail by way of examples. In the following examples, parts are by weight unless otherwise specified.

The measurement of the average particle size and the evaluation of storage stability are conducted by the following methods.

[Method for measurement of average particle size]

Using the polyurethane emulsions obtained in Examples and Comparative Examples as samples, the average particle size was measured by a laser diffraction particle size analyzer "SALD-2100" manufactured by Shimadzu Corporation. The value of the average particle size is a median size on a volume basis (particle size at which the cumulative distribution of particles becomes 50%).

[Method for Evaluation of Storage Stability]

The polyurethane emulsion was diluted to obtain a solution having a concentration of 20% by weight, which was charged in a test tube and allowed to stand. After one day had passed, the state of settlement was visually observed. A volume ratio of a transparent supernatant portion to the entire solution was visually measured and the storage stability was evaluated.

The results are shown in Table 1. The smaller "supernatant amount" as the volume ratio of the supernatant portion exhibits smaller settling rate and better storage stability.

Example 1

1000 Parts of polyoxypropylene glycol having a molecular weight of 1,000, 82.2 parts of dimethylolpropionic acid and 628.0 parts of isophorone diisocyanate were reacted at 90° C. in the presence of 0.2 parts of stannous octoate until the isocyanate group content reached 6.0% by weight to obtain a terminated isocyanate group-containing urethane prepolymer A (viscosity at 70° C.: 900 mPa·s, isocyanate group content: 6.0% by weight, carboxyl group content: 0.035 equivalents based on 100 parts by weight).

The urethane prepolymer A heating at 70° C. and water containing triethylamine, as a neutralizer, in an amount of 0.024 equivalents based on 100 parts by weight of water were simultaneously supplied in an emulsifying apparatus shown in FIG. 2 from separate inlets 8 of the emulsifying apparatus at a rate of 0.2 m$^3$ per hour (prepolymer) and a rate of 0.3 m$^3$ per hour (water).

An emulsification treatment was conducted at a peripheral velocity of a rotor section 3 of the emulsifying apparatus of 40 m/s to continuously obtain an emulsion of a urethane prepolymer having an average particle size of 0.18 μm shown in Table 1 at a rate of 0.5 m$^3$ per hour. Immediately after the emulsification treatment, a solution prepared by diluting hydrazine with water, which has an amino group in the amount corresponding to 90% of an isocyanate group, was added, thereby completing chain extension, thus yielding a polyurethane emulsion having a solid content of 35% by weight.

An emulsifying apparatus, in which a rotor section 3 has a diameter of 130 mm, a clearance between rotor teeth 4 and stator teeth 6 is 250 μm, and a slit width of a rotor tooth at the outermost periphery is 0.4 mm, was used.

Example 2

1000 Parts of polyoxypropylene glycol having a molecular weight of 650 and 675.0 parts of isophorone diisocyanate were reacted at 90° C. in the presence of 0.2 parts of stannous octoate until the isocyanate group content reached 7.5% by weight to obtain a terminated isocyanate group-containing urethane prepolymer B (viscosity at 70° C.: 1000 mPa·s, isocyanate group content: 7.5% by weight).

The urethane prepolymer B heating at 70° C. and water containing 10% by weight of a polyoxyethylene-polyoxypropylene copolymer, as an emulsifier, were simultaneously supplied in an emulsifying apparatus shown in FIG. 2 from separate inlets 8 of the emulsifying apparatus at a rate of 0.2 m$^3$ per hour (prepolymer) and a rate of 0.15 m$^3$ per hour (water).

An emulsification treatment was conducted at a peripheral velocity of a rotor section 3 of the emulsifying apparatus of 49 m/s to continuously obtain an emulsion of a urethane prepolymer having an average particle size of 2.4 μm shown in Table 2 at a rate of 0.35 m$^3$ per hour. Immediately after the emulsification treatment, a solution prepared by diluting hydazine with water, which has an amino group in the amount corresponding to 90% of an isocyanate group, was added, thereby completing chain extension, thus yielding a polyurethane emulsion having a solid content of 50% by weight.

The same emulsifying apparatus as in Example 1 was used.

Comparative Example 1

Figure 6:
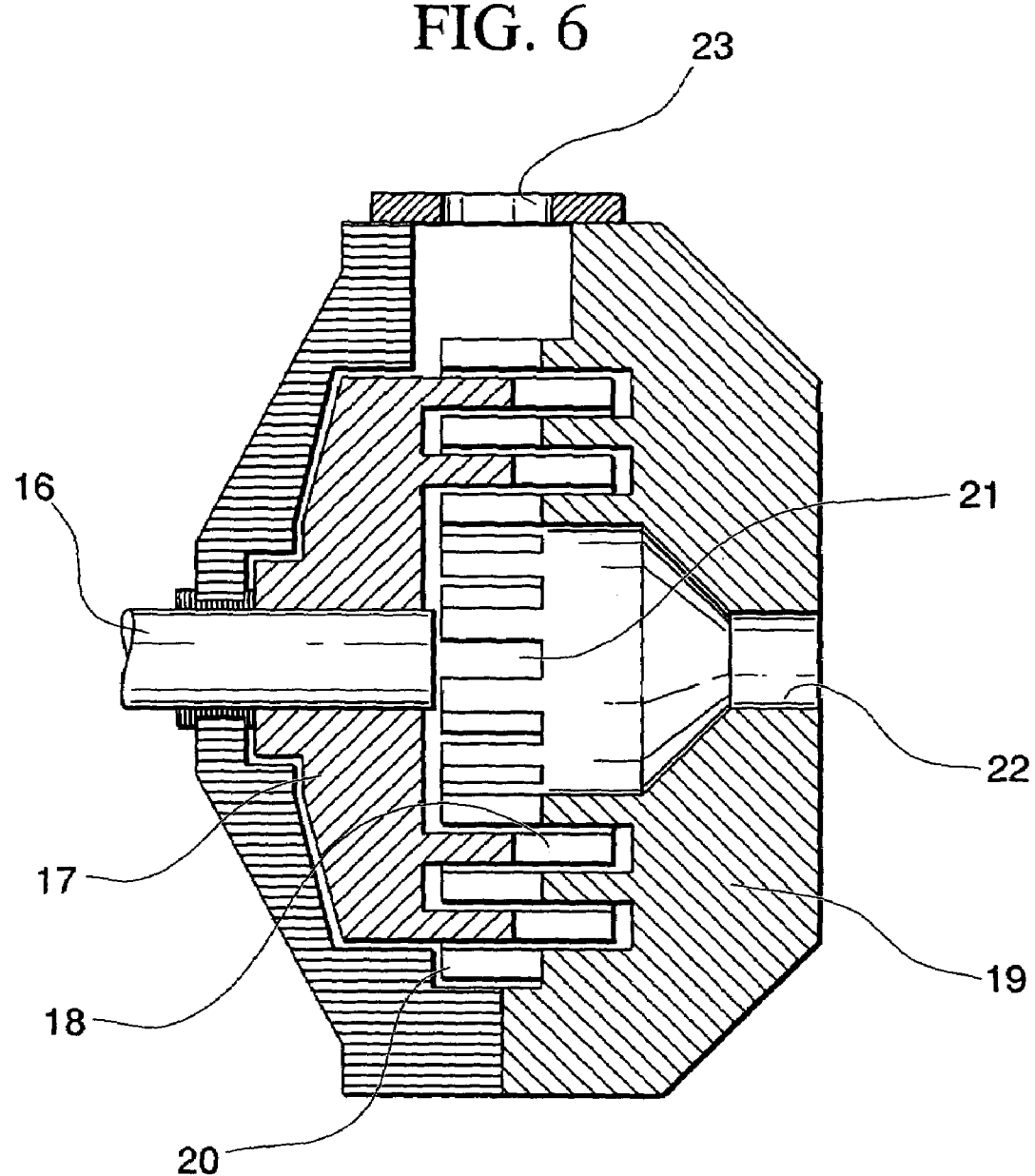
FIG. 6 is a sectional side view showing a rotor section 17 and a stator section 19 of an emulsifying apparatus of the prior art.

In place of the emulsifying apparatus shown in FIG. 2 used in Example 2, an emulsifying apparatus comprising a stator section 19 having an inlet 22 shown in FIG. 6 was used. In FIG. 6, the reference symbol 16 denotes a rotational shaft, the reference symbol 17 denotes a rotor section, the reference symbol 18 denotes rotor teeth, the reference symbol 20 denotes stator teeth, the reference symbol 21 denotes a space section, and the reference symbol 23 denotes an outlet. The same urethane prepolymer and water containing the emulsifier as those used in Example 2 were previously mixed by using a stirrer and the mixed solution was charged in an emulsifying apparatus at a rate of 0.35 m$^3$ per hour, and then an emulsification treatment was conducted at a peripheral velocity of a rotor section 3 of the emulsifying apparatus of 49 m/s. As a result, an average particle size of the resulting emulsion of the urethane prepolymer was 3.4 μm as shown in Table 2 and the urethane prepolymer is not finely dispersed. Immediately after the emulsification treatment, a solution prepared by diluting hydrazine with water, which has an amino group in the amount corresponding to 90% of an isocyanate group, was added, thereby completing chain extension, thus yielding a polyurethane emulsion having a solid content of 50% by weight. The supernatant amount was 65% and the resulting emulsion was drastically inferior in storage stability as compared to Example 2.

Comparative Example 2

Figure 7:
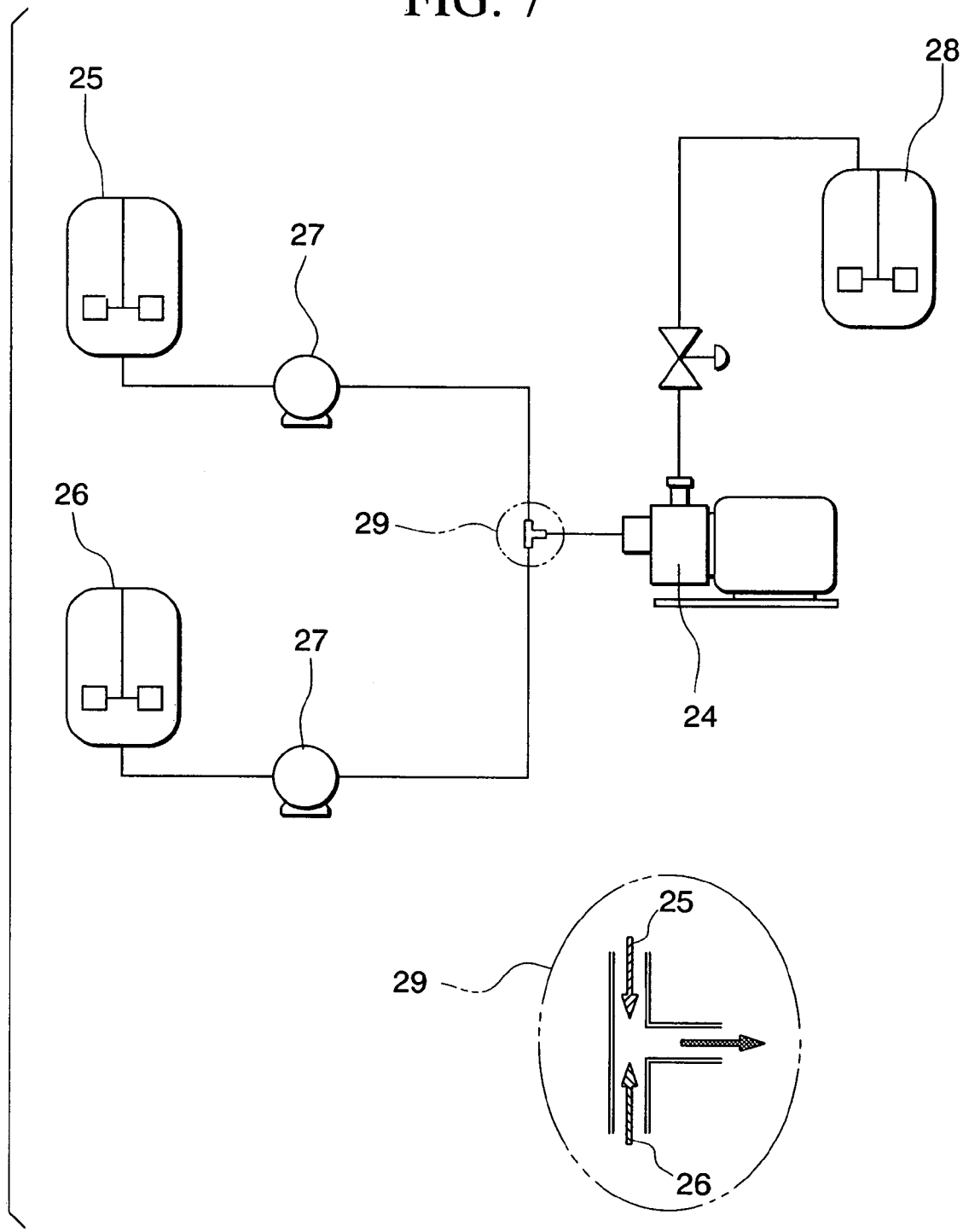
FIG. 7 is a schematic view showing a liquid feed line of an emulsifying apparatus of the prior art.

In place of the emulsifying apparatus shown in FIG. 2 used in Example 2, an emulsifying apparatus comprising a stator section 19 having an inlet 22 shown in FIG. 6 was used. Without previously mixing, a urethane prepolymer and water containing an emulsifier were charged in an inlet at a rate of 0.2 m$^3$ per hour (urethane prepolymer) and a rate of 0.15 m$^3$ per hour (aqueous emulsifier solution) using a liquid feed line of the emulsifying machine, in which flows of the urethane prepolymer and water meet at a mixing section 29 located right before the emulsifying machine, as shown in FIG. 7. In FIG. 7, the reference symbol 24 denotes a casing of the emulsifying machine, the reference symbol 25 denotes a urethane prepolymer reaction vessel, the reference symbol 26 denotes a water tank, the reference symbol 27 denotes a pump, and the reference symbol 28 denotes a product tank. An emulsification treatment was conducted at a peripheral velocity of a rotor section 3 of the emulsifying apparatus of 49 m/s. As a result, an average particle size of the resulting emulsion of the urethane prepolymer was 3.3 μm as shown in Table 2 and the urethane prepolymer is not finely dispersed. Immediately after the emulsification treatment, a solution prepared by diluting hydrazine with water, which has an amino group in the amount corresponding to 90% of an isocyanate group, was added, thereby completing chain extension, thus yielding a polyurethane emulsion having a solid content of 50% by weight. The supernatant amount was 55% and the resulting emulsion was drastically inferior in storage stability as compared to Example 2.

TABLE 1

|  | Example 1 |
|---|---|
| Average particle size (μm) | 0.18 |

TABLE 2

|  | Example 2 | Comparative Example 1 | Comparative Example 2 |
|---|---|---|---|
| Average particle size (μm) | 2.4 | 3.4 | 3.3 |
| Supernatant amount (%) | 21 | 65 | 55 |

What is claimed is:

1. A process for producing a polyurethane emulsion by emulsifying a urethane prepolymer, which contains substantially no organic solvent and also has at least two isocyanate groups per one molecule, with water and then completing chain extension, the process comprising:

a preliminary step of assembling an emulsifying apparatus comprising one pair of a stator section (A) having a surface (a) and a rotor section (B) having a surface (b), in which the surfaces (a) and (b) face and are parallel to each other, the stator section (A) being fixed inside a cylindrical casing and the rotor section (B) being fixed to a rotational shaft provided in the casing, wherein the stator section (A) has the surface (a) wherein multiple stator teeth are arranged on the surface along with two or more concentric circles, and the rotor section (B) has the surface (b) wherein multiple rotor teeth are arranged on the surface along with two or more concentric circles, in which a ring axis of the circles is the same as the ring axis of the circles of the stator section (A), but diameters of the concentric circles of the rotor section (B) are different from those of the stator section (A), side surfaces of said rotor teeth being parallel to an axis of rotation for said rotational shaft for said rotor section, a distance between the surface (a) and a top of the multiple stator teeth of the stator section (A) is longer than a distance between the surface (a) and a top of the multiple rotor teeth of the rotor section (B), and the stator section (B) has a supply inlet which is positioned in the smallest circle of the stator section (A), and an outlet, which is positioned at a side portion of the stator section (A), a first step of supplying a stream containing the urethane prepolymer into the emulsifying apparatus and separately supplying a stream containing water into the emulsifying apparatus so as to form an emulsion of the urethane prepolymer in water, from the inlet and continuously emulsifying them by having a peripheral velocity of a rotor tooth located at the outermost periphery among multiple rotor teeth of the emulsifying apparatus be within a range from 30 to 70 m/second so as to obtain an emulsion of the urethane prepolymer having an average particle size of 0.1 to 2.5 μm, and discharging the emulsion from the outlet, and a second step of reacting the emulsion of the urethane prepolymer obtained in the first step with a chain extender, thereby completing chain extension of the urethane prepolymer.

2. A process for producing a polyurethane emulsion by emulsifying a urethane prepolymer, which contains substantially no organic solvent and also has at least two isocyanate groups per one molecule, with water and then completing chain extension, the process comprising:

a preliminary step of assembling an emulsifying apparatus comprising one pair of a stator section (A) having a surface (a) and a rotor section (B) having a surface (b), in which the surfaces (a) and (b) face and are parallel to each other, the stator section (A) being fixed inside a cylindrical casing and the rotor section (B) being fixed to a rotational shaft provided in the casing, the stator section (A) has the surface (a) wherein multiple stator teeth are arranged on the surface along with two or more concentric circles, and the rotor section (B) has the surface (b) wherein multiple rotor teeth are arranged on the surface along with two or more concentric circles, in which a ring axis of the circles is the same as the ring axis of the circles of the stator section (A), but diameters of the concentric circles of the rotor section (B) are different from those of the stator section (A), side surfaces of said rotor teeth being parallel to an axis of rotation for said rotational shaft for said rotor section, a distance between the surface (a) and a top of the multiple stator teeth of the stator section (A) is longer than a distance between the surface (a) and a top of the multiple rotor teeth of the rotor section (B), and the stator section (B) has at least two inlets for supplying the streams independently, which are positioned at a side portion of the stator section (A), a first step of supplying a stream containing the urethane prepolymer into the emulsifying apparatus and separately supplying a stream containing water into the emulsifying apparatus so as to form an emulsion of the urethane prepolymer in water, continuously emulsifying them by having a peripheral velocity of a rotor tooth located at the outermost periphery among multiple rotor teeth of the emulsifying apparatus be within a range from 30 to 70 m/second so as to obtain an emulsion of the urethane prepolymer having an average particle size of 0.1 to 2.5 μm, and discharging the emulsion from the outlet, and a second step of reacting the emulsion of the urethane prepolymer obtained in the first step with a chain extender, thereby completing chain extension of the urethane prepolymer.

3. The process for producing a polyurethane emulsion according to claim 1, wherein a clearance between the rotor teeth and the stator teeth of the emulsifying apparatus is within a range from 100 to 500 μm.

4. The process for producing a polyurethane emulsion according to claim 1, wherein a blade is provided in a space section surrounded by the rotor section and the stator section of the emulsifying apparatus.

5. The process according to claim 2, wherein the stator section has two inlets, and the urethane prepolymer is supplied from one of the inlets, and the water is supplied from the other of the inlets.

* * * * *